dependent variable, and performing the summation at a fixed frequency, is comparable to summing the area under the curve of the dependent variable versus time. This integration process is termed "approximate" because the increments of the independent variable are finite and are not made to approach zero as in the case of ideal mathematical integration.

This invention may be utilized to perform integration by various approximate integration techniques. It has been determined that integration performed by the midpoint integration technique insures the most accurate correspondence at the end of the sampling period to the result of ideal integration when compared to integration performed by sampling at any other defined sampling time during the sampling period.

In a particular embodiment of the invention, described more fully later with respect to FIG. 1, a servo-mechanism converts a voltage analog representation of a time dependent physical variable into a representative mechanical motion. The servo-mechanism is coupled to an analog to digital converter which is operated by the mechanical motion to provide a digital representation of the analog representation. The digital representation is sampled at a particular periodicity by a readout circuit and the two's complement thereof in binary form is stored in parallel in a binary counter. A pulse producing system initiates both a group of electrical pulses and an exactly corresponding group of angular increments simultaneously with the transfer of the two's complement into the binary counter for each sample. The electrical pulses cause the counter to count toward capacity. When the counter reaches capacity or a pre-selected binary interval, another system causes the pulse producing system to stop producing the pulses. Each group of angular increments is also transferred to a summing device. The output of the summing device is an analog integral representation of the variations of the physical variable. The integral representation is also readily presented as an output in digital form.

FIG. 1 presents a block diagram of a particular embodiment of the integrator of this invention in which analog and digital components are functionally combined and in which aspects of open-loop and closed-loop design are incorporated. Unless otherwise specified, particular components are of conventional design and electrical and mechanical connections are according to standard procedures. Analog voltage input 10 is present to a positional servo-mechanism 12 which converts it into a corresponding angular shaft representation. Once energized, the servo-mechanism follows the input voltage within a small error. The angular representation of analog voltage input 10 operates analog to digital converter 14 which digitizes the shaft representation to provide a corresponding digital representation in binary form. The two's complement of the binary representation is transferred via ambiguity network 16 to $N+1$ order binary counter 18 when caused to do so by readout signal 20. An ambiguity problem is involved in the analog to digital converter 14 when it is a mechanical encoder because there are two brushes for each order track except the least significant. The ambiguity network 16 selects the correct brushes for proper readout. The two's complement of the binary representation of the analog voltage input 10 is transferred via ambiguity network 16 to a binary counter 18 on a plurality of channels $C_1$ to $C_n$. The two's complement of an $n$ order binary number is that number which when added thereto gives a sum $2^{n+1}$.

Frequency source 22 provides a group of equally spaced voltage timing pulses at a pre-established frequency. The train of pulses from frequency source 22 is transferred to countdown and control generator 24. Generator 24 provides the following control signals: clutch-on signal 26, readout signal 20, and reset signal 30. The function of the readout signal 20, as noted above, is to cause the transfer of binary information from analog to digital converter 14 to $N+1$ order counter 18. The functions of the clutch-on and reset signals will be described below. Generator 24 also provides the alternating frequency for synchronous motor 32 via amplifier 34.

The motor 32 output shaft is geared to clutch input shaft 36 via gearing 38. Clutch 40 is electrically operated and joins clutch output shaft 42 to clutch input shaft 36. Clutch output shaft 42 is coupled via gearing 43 to output summing device 44. The gearing provides flexibility in design and mechanical inertia matching. Tone wheel 45, described later with respect to FIG. 7, clutch-on output shaft 42 provides a plurality of electrical pulses 52, the separation between said tone wheel pulses being determined by the angular spacing between the teeth of the tone wheel. Output summing device 44 sums the angular increments of motion of the tone wheel and provides an integral output 50 representation of the analog voltage input 10 and consequently of the dependent physical variable. The tone wheel pulses 52 are transmitted via a wave shaper 54 and amplifier 56 to $N+1$ order counter 18 which in turn is coupled to logic network 58.

Logic network 58 provides a logic brake signal 60 when the counter 18 has reached a number which is a pre-determined number less than the two's complement of the binary number which had been previously transferred thereto from the analog to digital converter 14. The logic brake signal 60 gates AND circuit 62 and AND circuit 64. AND circuits 62 and 64 permit the clutch control 66 and brake control 68 to operate alternately during what is termed the "stepping mode." During the stepping mode energy is taken from the motor shaft 36 incrementally and the clutch output shaft 42 rotation is brought to a stop in a preferred manner.

The AND circuit 62 is opened by the logic brake signal 60 and a "not $N+1$" signal from the $N+1$ order of the counter 18 and is gated by the tone wheel pulses 52. The output of AND circuit 62 operates stepping trigger 70. The output of stepping trigger 70 alternately operates brake control 68 via AND circuit 64 and brake delay 74 and clutch control 66 via clutch delay 76. For this to occur, AND circuit 64 is thereby operated by the logic brake signal 60 and stepping trigger output 78 while clutch control 66 is operated by stepping trigger output 80. The clutch control 66 initially operates the clutch 40 on command of the clutch-on signal 26.

After the integral representation of the dependent variable is stored in output summing device 44 for a particular sample period, both the counter 58 and stepping trigger 70 are reset by reset signal 30.

The functional relationship of the various features of the embodiment of the invention shown in FIG. 1 will be discussed now with reference to FIG. 2 which is a functional block diagram thereof.

*Input 10.*—The input 10 is either an A.C. or D.C. voltage which varies with respect to the variable to be integrated.

*Voltage to angle converter 100.*—Positional servo-mechanism 12 (FIG. 1) converts the continuous input voltage into an angle. Either A.C. or D.C. operation is obtained by energizing the feedback potentiometer thereof with A.C. or D.C. voltage corresponding to whether the voltage analog representation is A.C. or D.C. It is necessary for integration accuracy that the servo-mechanism follow the changes of the input voltage within an allowable error. This condition is met by proper damping and a high velocity constant of the servo-mechanism.

*Angle to digital converter 102.*—A shaft to digital encoder, analog to digital converter 14 of FIG. 1, is geared to the feedback potentiometer shaft to the positional servo-mechanism 12. The output of this unit is a binary number, which is proportional to the angular position of the servo-mechanism output shaft. The device provides a plurality of wires. A wire exists for each order of the binary number.

brake" signal generated a fixed number of tone wheel pulses before the occurrence of $N+1$ order brake signal. The number of tone wheel pulses before the occurrence of $N+1$ order brake signal from counter 18 is dependent on the stopping time of the output shaft 42. A circuit, similar to logic network 58 of FIG. 1, is used to generate the "predicted final brake" signal. Usually, the output shaft 42 has reached synchronous speed when the "predicted final brake" signal is applied thereto and this method of braking is satisfactory in many applications of the integrator in accordance with this invention. The final positioning accuracy depends directly on torque and friction characteristics of the clutch 40.

An integrator in accordance with this invention is essentially an open-loop device. However, feedback exists in the form of information which can not cause and unstable condition. The tone wheel pulse 52 is sent in feedback to the clutch 40. In general, open-loop devices depend upon the calibration of a particular element to maintain accuracy. This is true of the embodiment of the invention shown in FIG. 1. The tone wheel 45 supplies the necessary information for positioning output shaft 42, but there is little possibility of the tone wheel losing calibration. The integrator optimizes the prime characteristics of both a closed-loop and an open-loop system without the usual attendant problems. The integrator has feedback with no attendant instability and a calibration element which does not vary in calibration over any reasonable time span.

Additional details of the embodiment of the invention shown in FIG. 1 will now be presented.

The analog voltage input 10 is obtained from the particular physical variable involved by conventional instrumentation. For example, the temperature of a particular system may be monitored by a thermocouple coupled to associated conventional sensing mechanism to provide the requisite analog voltage.

An illustrative embodiment of positional servo-mechanism 12 is shown in FIG. 8. The positional servo-mechanism 12 illustrated receives the voltage analog representation of a physical variable as input 10, or $f(t)$, at its input amplifier 150. Amplifier 150 drives a motor 152 which in turn drives a generator 154 by motor-generator shaft 156. The electrical output of the generator 154 is coupled to input amplifier 150 by conductor 158 to enhance the response of the positional servo-mechanism 12. The motor-generator shaft 156 also drives a potentiometer 160 via gearing 162. The output voltage 163 of potentiometer 160, which is proportional to the motor-generator shaft 156 angular position, is coupled in negative feedback to amplifier 150 by conductor 164. The main requirements of positional servo-mechanism 12 are that it have small positional and velocity errors. A high gain in amplifier 150 and sufficient resolution of feedback potentiometer 160 insure that there are small positioning errors. The velocity error of the positional servo-mechanism 12 is controlled by its pre-established velocity constant. The motor-generator shaft 156 of positional servo-mechanism 12 drives analog to digital converter 14 of FIG. 1.

Several analog to digital converters of the mechanical encoder type, suitable for analog to digital converter 14, are described in the text, "Control Engineer's Handbook" by J. G. Truxal, published by McGraw-Hill Book Company, Inc., New York, 1958. A mechanical encoder quantizes a shaft angle into $2^n$ discrete steps.

The ambiguity network 16 selects the correct brushes of the analog to digital converter 14 for proper readout thereof. Ambiguity results from there being two positions for each order of a mechanical encoder except the least significant order. The ambiguity network 16 insures that all positions of the encoder are read in the middle portion of each conducting segment thereof (except for the least significant order). An ambiguity network, suitable for incorporation in this invention, is described in the journal "Space Aeronautics," November 1958, pages 135–144, in an article entitled "Inertial Guidance System Uses Digital Integrator," by H. J. Weber. The same article describes a component array suitable for application with this invention for the positional servo-mechanism 12, analog to digital converter 14, ambiguity network 16 and $N+1$ order counter 18. A binary converter suitable for application with this invention which does not require an ambiguity network is described in the journal "Electrical Manufacturing," January 1959, pages 136–139, in an article entitled "10-Bit Resolution in Shaft-Position to Digital Encoder," by W. E. Stupar.

The analog to digital converter 14 output is transferred to the $N+1$ order counter 18 and placed therein as the two's complement of the binary number. Alternative techniques are available for placing the two's complement into the counter. For example, it is possible to set the $N+1$ order counter 18 in its least significant order as a binary one and thereafter to transfer to the counter the one's complement of the digital representation binary number in the analog to digital converter 14. The $N+1$ binary counter 18 is composed of $N+1$ triggers cascaded in binary fashion. The inputs $C_1$ to $C_n$ are applied in parallel thereto by direct input to each respective trigger. The tone wheel pulses 52 are counted in serial binary addition by $N+1$ order counter 18.

The speed of the synchronous motor 32 and ratios of gearing 38 and 43 are chosen to provide a large number of tone wheel pulses per sampled digital representation.

The output summing device 44 can be any shaft driven device or means of counting shaft rotation. It should have good linearity and good resolution.

The tone wheel 45 is illustrated in FIG. 7. There is provided a non-magnetic metal disc 170 having several teeth 172 thereon. Adjacent the tone wheel teeth 172 on opposite sides of tone wheel 170 are permanent magnets 174 and 176. Electrical windings 178 and 180 are, respectively, wrapped on the magnets 174 and 176, and are connected in series. The voltage output at terminals 182 and 184 is approximately a sine wave. A tone wheel pulse is provided for each $\Delta\theta$ angular increment of the tone wheel 45.

The clutch 40 is operated through the action of an electrostatic force generated by a voltage applied across a dielectric medium. It has a fast response time and can accelerate moderate loads to high revolutions per minute in a few milliseconds. An electrostatic clutch, suitable for application with the embodiment of this invention shown in FIG. 1, is described in the "IBM Journal of Research and Development," January 1957, pages 49–56, in an article entitled "Development of the Electrostatic Clutch," by C. J. Fitch.

The clutch control 66 and brake control 68 incorporate, illustratively, on-off vacuum tube switches and the circuitry described above for actuating the braking and clutching operations of clutch 40. The brake delay 74 and the clutch delay 76 are, illustratively, monostable multivibrators.

The logic network 58 is a conventional combination of "AND" circuits connected with the respective orders of the $N+1$ order counter 18. It causes a logic brake signal 60 when a particular pre-established number less than capacity of the counter 18 has been reached. A conventional bistable multivibrator in logic network 58 causes the logic brake signal to remain on until it is reset at the end of a sample period.

An integrator in accordance with this invention is a flexible device which is capable of being applied in a multitude of applications. It is particularly applicable where environmental conditions create problems with other integrators. It is relatively unaffected by severe temperature and vibration environments. The nature of its components and the design philosophy make malfunctioning due to severe environmental conditions highly improbable. For example, in the particular embodiment shown in FIG. 1, a positional servo-mechanism 12 hav- AND circuit and a second AND circuit; a wave shaper connected to said tone wheel, an amplifier connected to said wave shaper, said tone wheel and said amplifier providing tone wheel information pulses to said counter and to said first AND circuit; said reset signal resetting said counter and said stepping trigger at the end of a sampling period; said brake control and said clutch control being adapted to actuate said electrostatic clutch and said brake alternately when said counter reaches a predetermined number less than said two's complement form; said clutch-on signal operating said clutch control at approximately the same time as said readout signal causes said analog to digital converter to transfer said two's complement form to said counter whereby said tone wheel electrical pulses control the operation of said electrostatic clutch and the angular increments of said tone wheel are stored in said output summing device as said integral representation.

4. An integrator for providing an integral representation of a physical variable comprising, in combination: a servo-mechanism to convert said voltage analog representation into a corresponding mechanical motion; an analog to digital converter adapted to receive said mechanical motion and to provide a corresponding digital representation of said analog voltage in binary form and the two's complement form thereof; means for sampling said digital representation at a particular periodicity; a binary counter adapted to store said two's complement form; means for producing a group of electrical information pulses and an exactly corresponding group of angular increments; said binary counter being adapted to count said electrical information pulses in serial addition; control means connected to said binary counter adapted to provide a control signal when said binary counter reaches a pre-established number to terminate said means for producing, said control means including a clutch system for braking and for clutching said means for producing, a slew mode control circuit and a stepping mode control circuit, said slew mode control circuit causing said clutch system to actuate said means for producing whereby a first plurality of said electrical information pulses are provided which are equally spaced, said stepping mode control circuit causing said clutch control system to actuate said means for producing whereby a second plurality of said electrical information pulses are provided which are sequentially increasingly spaced, said braking occurring over increasing lengths of time and said clutching occurring over equal lengths of time; and output summing means to sum said angular increments to provide an analog integral representation of said physical variable.

5. The combination of claim 4 in which said clutch system includes a brake control and a clutch control, a brake delay and a clutch delay connected thereto, respectively, a logic network having a first AND circuit, a second AND circuit and a stepping trigger circuit; said logic network being connected to said brake delay and said clutch delay to cause said brake control and clutch control to cause said clutch system to stop said means for producing incrementally.

6. An analog signal integrator, comprising:

means for converting the analog signal into corresponding digital binary electric signals;

means for transforming the digital signals into corresponding binary two's complement signals;

means for periodically sampling the complement signals;

a binary counter connected to count the sampled signals;

a shaft;

means for selectively effecting incremental rotation of the shaft;

an electric pulse generating driven by the shaft and providing a pulse for each increment of rotation;

circuit means interconnecting the pulse generating means and the counter in counting relation;

control means responsive to the counting condition of the counter for terminating movement of the incremental rotation means on capacity of the counter being reached; and summation means operatively related to the output shaft for providing a representation of the sum of the incremental rotations corresponding to the integral of the analog signal.

References Cited in the file of this patent

UNITED STATES PATENTS

| | | |
|---|---|---|
| 2,496,912 | Grosdoff | Feb. 7, 1950 |
| 2,729,773 | Steele | Jan. 3, 1956 |
| 2,829,323 | Steele | Apr. 1, 1958 |
| 2,841,328 | Steele et al. | July 1, 1958 |
| 2,850,232 | Hagen et al. | Sept. 2, 1958 |
| 2,852,187 | Beck | Sept. 16, 1958 |
| 2,932,449 | Pisarchik | Apr. 12, 1960 |
| 2,971,141 | Gevas | Feb. 7, 1961 |